Jan. 16, 1951 A. C. KRACKLAUER 2,538,575
FILTER CLEANOUT MECHANISM
Filed May 13, 1949 2 Sheets-Sheet 1

INVENTOR.
Aloysius C. Kracklauer
BY
Blenning & Blenning
Attys.

Jan. 16, 1951     A. C. KRACKLAUER     2,538,575
FILTER CLEANOUT MECHANISM
Filed May 13, 1949     2 Sheets-Sheet 2
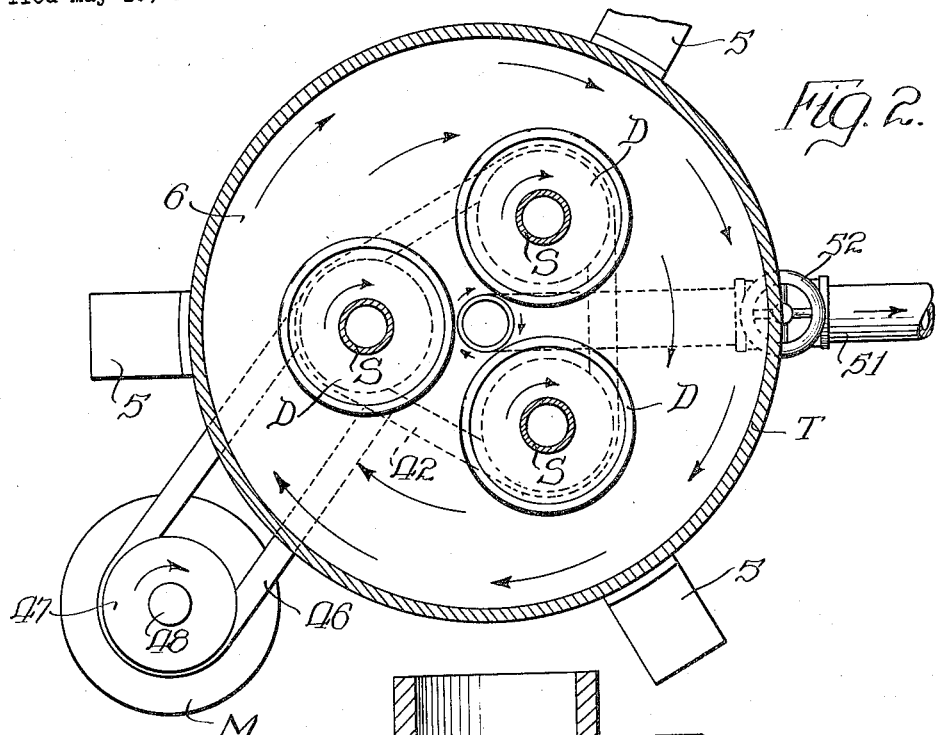
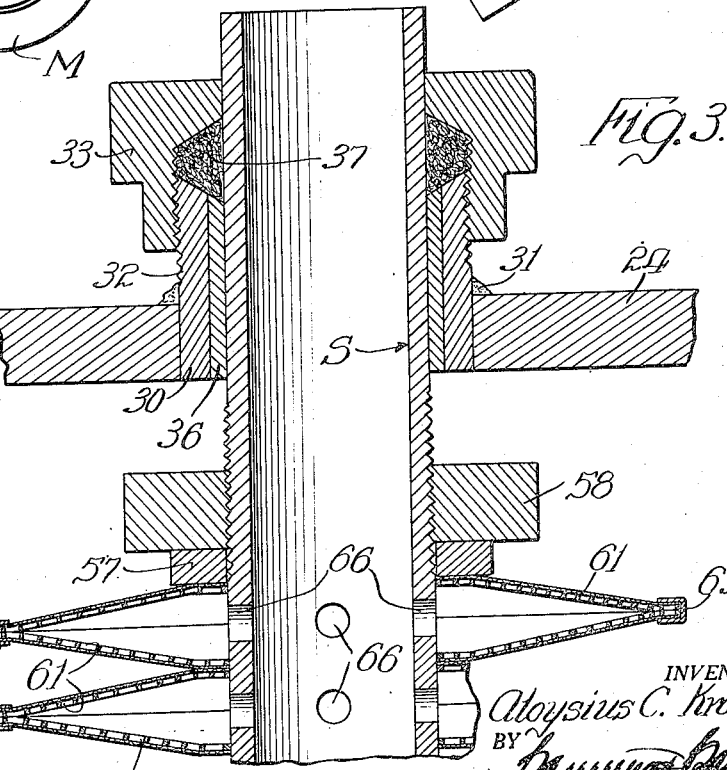
INVENTOR.
Aloysius C. Kracklauer Patented Jan. 16, 1951

2,538,575

UNITED STATES PATENT OFFICE 2,538,575

FILTER CLEANOUT MECHANISM

Aloysius C. Kracklauer, Mundelein, Ill.

Application May 13, 1949, Serial No. 92,999

8 Claims. (Cl. 210—184)

This invention relates to a clean-out mechanism incorporated in a filter tank into which liquid is fed under pressure to be relieved of its impurities. The filtered liquid, when discharged, leaves behind a residue which accumulates in increasing quantities as the filtering operation proceeds. There is accordingly a great need for some sort of a clean-out mechanism which can be operated periodically to restore the filter to full effectiveness, and it is with this objective that my present invention is concerned.

In the present apparatus I utilize a pressure tank containing a plurality of axially aligned conical discs whose opposed faces are formed of a fine mesh screen or other filtering medium. The liquid to be filtered passes into the discs and then on into a hollow shaft whereon other like discs are mounted. In the course of time the sediment separated out from the liquid under treatment will collect on the discs to such an extent as to greatly reduce their effectiveness; when this occurs the filter must be shut down so that a clean-cut operation may proceed. This operation takes valuable time, and hence is costly to all concerned.

According to the present invention the hollow shafts whereon the filter discs are mounted are journaled to rotate unidirectionally in unison about parallel axes in response to power which is transmitted thereto. For this purpose a small motor may be mounted close to the pressure tank to operate the several shafts whereby to rotate the discs. Such a rotation, particularly when the discs are arranged in the special manner hereinafter set forth in detail, will produce a rapid and thorough dislodging of the accumulated sediment so that the filter may again be placed in operation after only a very brief interruption.

The mechanism employed for carrying out the present invention is simple, inexpensive, and quite effective for the purpose. It is compact, and readily accessible in case that disassembly, repairs, or replacements be required. Although my invention may vary widely in many details, the particular arrangement and construction illustrated in the accompanying drawings may be taken as one which is highly advantageous and satisfactory.

Referring now to the drawings:

Fig. 2 is a horizontal section, taken on line 2—2 of Fig. 1; and

Fig. 3 is an enlarged detail in vertical section, taken on line 3—3 of Fig. 1.

Figure 1:
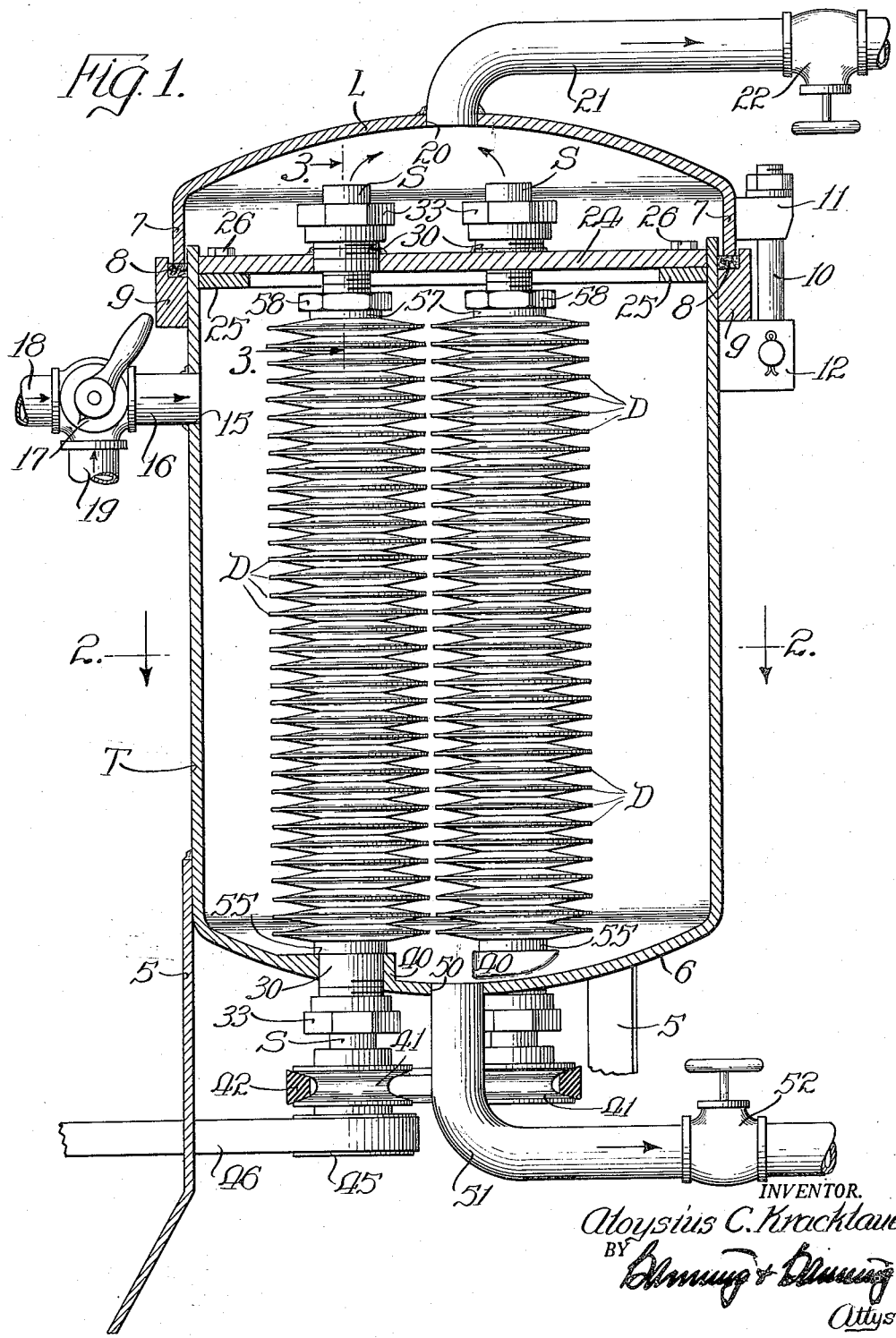
Figure 1 is a longitudinal vertical section through a pressure filter tank, equipped with the special clean-out mechanism of this invention.

The tank T herein shown is cylindrical with its axis vertically disposed. It may be supported upon legs 5 which are rested on a floor or other suitable structure. The tank bottom 6 is preferably dished downwardly, and the open top of the tank is provided with a lid L which is upwardly crowned. Depending from the lid is a peripheral flange 7 seating upon a gasket 8 which is fitted within the channel of a ring 9 that is affixed to the tank wall exteriorly thereof near its top. A plurality of bolts 10, which extend through a like number of pair of lugs 11 and 12, engage operatively therewith to secure the lid tightly to the tank.

In the wall of the tank is an inlet port 15 to which is affixed a pipe connection 16 wherein is a three-way valve 17. From this valve one connection 18 leads to a source from which liquid is pumped to the tank to be filtered; a second connection 19 leads to a source of fresh water with which to flush the tank periodically. The present filter apparatus may be used advantageously for the filtering of water in swimming pools, various aqueous solutions, solvents, sugars, syrups, etc.; in fact, any liquid that can be washed off with a solvent.

The lid L is formed with an outlet port 20 from which is extended a pipe 21 with an interposed valve 22. The tank is provided near its top with a transverse partition 24 that is rested upon a ring 25 which is affixed to the tank interiorly thereof. As by means of bolts 26 which traverse the partition to enter tapped openings within the ring, the partition 24 may be secured fixedly in place. This partition defines an outlet chamber between itself and the crowned lid L thereabove, the space below the partition providing the main chamber wherein the filtering operation proceeds.

The partition 24 is formed with a plurality of symmetrically disposed openings, three being the number shown, and into each of these openings is fitted a collar 30 which extends upwardly therefrom (see Fig. 3). Each collar, which may be secured fixedly in place as by welding 31, is exteriorly threaded at 32 in its upper region to receive a packing nut 33 which is screw threaded thereupon.

Each packing nut fits closely around a hollow shaft S which is journaled for rotation within a sleeve bearing 36 carried by the collar 30 interiorly thereof. At its upper end this sleeve terminates at the lower face of an annular chamber within the nut wherein is a compressible packing 37. By advancing the nut upon the collar, in the usual way, the packing will be compressed against the shaft S to prevent leakage of liquid longitudinally thereof.

The several hollow shafts S extend for the full length of the main filtering chamber, and the lower end portion of each is journaled for rotation within a sleeve-packing nut-collar assembly the same as already described. Upstanding from the tank bottom 6 are three hollow bosses 40 wherein the associated collars are supported. At or near the bottom end of each shaft is mounted a pulley 41, a belt 42 being trained over the several pulleys so as to interconnect the shafts for unidirectional rotation in unison (see Fig. 2). One of the shafts is extended downwardly a sufficient distance to receive a second pulley 45 from which is extended a belt 46 to pass around a pulley 47 which is carried fast on the shaft 48 of a motor M whose power is thereby transmitted to the several shafts to produce rotation thereof.

In the arrangement shown, there are three shafts although this number might be more or less. The shafts are symmetrically disposed within the cylindrical tank so as to be spaced equidistantly from its axis. A clean-out port 50 is provided in the tank bottom and in connection therewith is a drain pipe 51 with an interposed valve 52. It is through this drain pipe that the sludge is discharged from the tank when the operation of cleaning the several filter columns is performed.

Fitted upon each shaft in its lower end region is a spacer ring 55 which rests upon the boss 40, and threaded upon the shaft thereover is a column of conical filter discs D, one resting upon another, the topmost disc being positioned relatively close to the underside of the partition 24. Here another spacer ring 57 is fitted onto the shaft to rest upon the topmost disc where it receives pressure from an overlying nut 58 which is threaded onto the shaft in a region where screw threads are provided. In this way the several conical discs D which are assembled onto each shaft are secured tightly in place, one in engagement with another, so as to substantially preclude any leakage of liquid therebetween.

Each filter disc, as shown, comprises two opposed relatively flat cones 61 which are connected peripherally as by a clamping ring 63. Incorporated in each cone is a fine mesh filtering medium which separates out solid particles and impurities from liquid which passes therethrough to enter into the interior of the disc D. Between the two cones of each disc are ports 66 through the shaft S so as to establish communication with the hollow space interiorly thereof. The upper end of each shaft is open to permit liquid to flow therethrough into the outlet chamber, but the bottom ends of the shafts are closed.

In operation, liquid is fed under pressure to enter the tank at a point which is desirably near its upper end. Filter aid in a suitable amount is added to the liquid in accordance with usual practice. At this stage of the operation, the shafts are motionless. The liquid finds its way through the conical discs and in so doing the solid particles separated therefrom are deposited on the exterior faces of the discs. The purified liquid then passes into the hollow shafts and upwardly therethrough to emerge at the top into the outlet chamber from which it then passes on out through the outlet pipe 21. In the course of time, particularly because of the presence of the filter aid which is a usual ingredient in the filtering operation, a deposit will accumulate upon the faces of the discs so that effectiveness of the filtering action is greatly impaired. It then becomes necessary to interrupt the operation to clean off the discs preliminary to a resumption of further filtering.

For this purpose the outlet valve 22 is first closed and the sludge discharge valve 52 is opened. At the same time the three-way valve 17 is operated to close the inlet pipe 18 and open communication with the pipe 19 in connection with a source of fresh water. The motor is also started to set in motion the several shafts whereon the conical discs are mounted. The discs are revolved unidirectionally and in unison, and the sludge whose removal is thereby accelerated is removed along with the water which is discharged through the drain pipe 51.

During the clean-out operation, backwashing of the filter is greatly enhanced due to the centrifugal force which is generated by rotation of the hollow shafts on which the conical discs are carried. Since these discs are rotated unidirectionally, they tend to produce a swirling motion of the liquid within the tank. This is indicated by the arrows in Fig. 2. This swirling of the liquid body is strongest where there is a clear circular path, viz to the outside of the several shafts. Inwardly of the shafts the liquid is also maintained in motion, but with some accompanying agitation. The conical discs are continuously rotated so that every portion of their surfaces are recurrently subjected to the impinging forces which are operating outside and inside of the axes of the several shafts as well as therebetween.

The rotational movement of the liquid body within the tank, and which is brought into recurrent impingement with the several discs, exerts a powerful force which tends to dislodge the sediment accumulated within the conical filter. This clean-out operation for removal of the sediment need continue but a very short time —only a fraction of that which is customarily required for dislodgment of the sediment. As fast as the sludge is freed, it is washed out of the tank through the drain pipe 51, the result being that in a few minutes the filter apparatus is cleaned out ready for further operation.

I claim:

1. A filter tank having an inlet through which liquid to be filtered is received thereinto, an outlet through which the filtered liquid is discharged therefrom, valves in the inlet and outlet normally open during a filtering operation, a drain outlet through which filtered residue is flushed out from the tank, a valve for the drain outlet normally closed during a filtering operation, a plurality of shafts symmetrically disposed with their axes in substantial parallelism each journaled for rotation about a fixed axis in the tank and extended to a point proximate to the discharge outlet, means providing a passageway lengthwise of each shaft open at the discharge outlet and closed at its opposite end, a plurality of hollow filtering discs in column arrangement carried by each shaft and mounted to rotate therewith, there being means of communication between each shaft passageway and the interior of the hollow discs carried thereby to admit liquid filtered therethrough to pass lengthwise of the shaft toward the discharge outlet for eduction therethrough, and power means for rotating in unison the shafts and discs carried thereby to interact in producing within the tank adjacent its walls a unidirectional rotational movement of the liquid body, and other multidirectional swirling movements thereof within an orbit proximate to or inwardly of the shaft axes, the inlet when admitting fresh water and the drain outlet when open providing a circulatory system wherein the rotating discs are disposed and into which residue dislodged centrifugally therefrom and by impingement of the rotating and swirling liquid body is deposited for transmission outwardly of the tank through the drain outlet thereof.

2. A filter tank according to claim 1 in which a partition separates that portion of the tank wherein the filtering discs are disposed from an outlet chamber in communication with the discharge outlet, the partition providing a mounting for one end portion of each shaft.

3. A filter tank according to claim 1 in which there are plural shafts arranged in substantial parallelism each carrying a plurality of hollow filtering discs, and in which the shafts are interconnected to rotate in unison.

4. A filter tank according to claim 1 in which there are plural shafts arranged in substantial parallelism each carrying a plurality of hollow filtering discs, and in which the shafts are interconnected to rotate unidirectionally in unison.

5. A filter tank provided with a partition to define a main filtering chamber and an outlet chamber, an inlet into the filtering chamber of the tank and an outlet from the outlet chamber thereof, valves in the inlet and outlet arranged, when open, to place the two chambers in a first circulatory system wherein a filtering operation may proceed, a plurality of shafts symmetrically disposed with their axes in substantial parallelism and extending from the outlet chamber through the filtering chamber, means providing a passageway lengthwise of each shaft open at the outlet chamber and closed at the opposite end, bearings wherein the shafts are journaled for rotation each about a fixed axis, a plurality of filtering discs carried by each shaft and mounted to rotate therewith, there being means of communication between each shaft and the interior of the supported hollow discs to admit liquid filtered thereby to pass lengthwise of the shaft and outwardly therefrom into the outlet chamber for eduction therefrom, and power means for rotating the shafts and discs carried thereby to interact in producing within the tank adjacent its walls a unidirectional rotational movement of the liquid body and other multidirectional swirling movements thereof within an orbit proximate to or inwardly of the shaft axes, the inlet when admitting fresh water and the drain outlet when open providing a second circulatory system to carry off residue dislodged from the rotating discs by centrifugal force and by impingement of the rotating and swirling liquid body and to transmit such residue outwardly of the tank through the drain outlet thereof.

6. A filter tank according to claim 5 wherein the tank is cylindrical and its axis vertically disposed, wherein the partition is near the upper end of the tank so as to position the outlet chamber at its top, wherein the partition provides a mounting for the upper end portion of each shaft, and wherein the tank bottom provides a mounting for the lower end portion of each shaft.

7. A filter tank according to claim 5 in which there are three hollow shafts spaced equidistantly from each other.

8. A filter tank according to claim 5 in which the shafts are extended through the tank bottom, and in which the shafts are interconnected below the tank bottom to rotate in unison.

ALOYSIUS C. KRACKLAUER.

REFERENCES CITED

The following references are of record in the file of this patent:

UNITED STATES PATENTS

| Number | Name | Date |
|--------|------|------|
| 217,442 | Belcher | July 15, 1879 |
| 630,363 | Krause | Aug. 8, 1899 |
| 671,003 | Ruthenberg | Apr. 2, 1901 |
| 1,666,515 | Sweetland | Apr. 17, 1928 |
| 1,670,319 | Sweetland | May 22, 1928 |
| 2,475,561 | Cooperider et al. | July 5, 1949 |